No. 631,061. Patented Aug. 15, 1899.
C. C. BARBOUR.
DRYING AND HEATING APPLIANCE FOR LAUNDRIES. &c.
(Application filed Sept. 6, 1898.)
(No Model.)
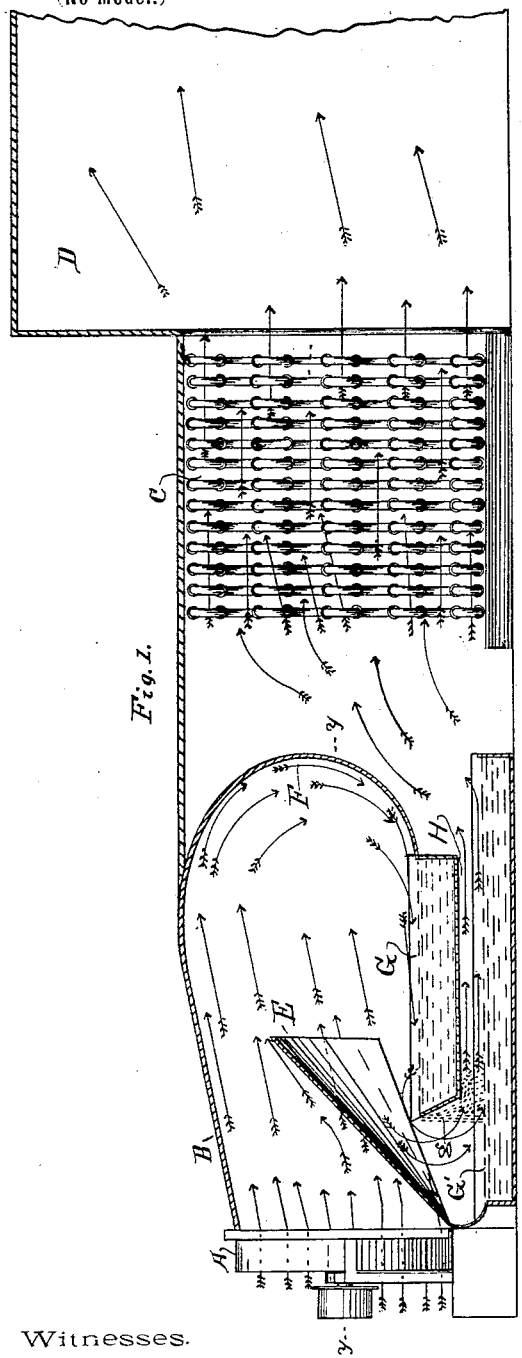
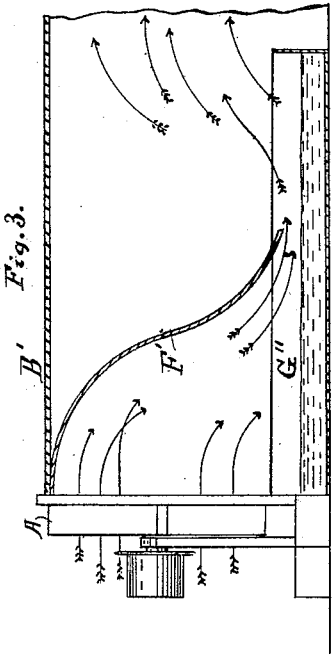
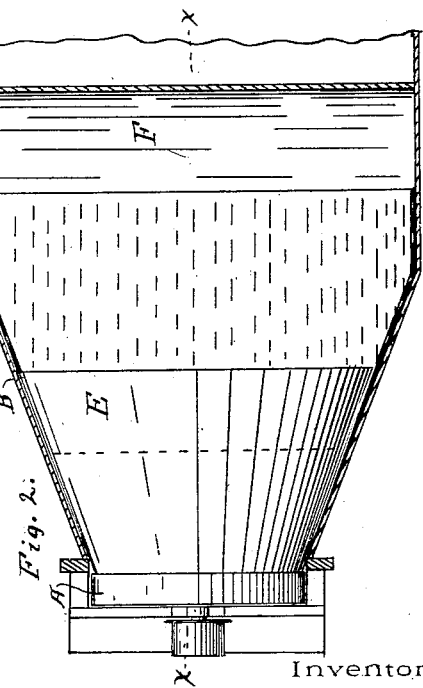
Witnesses.
G. E. Cilley
F. E. Shaffer.
Inventor.
Charles C. Barbour
By Ithiel J. Cilley
Attorney.

UNITED STATES PATENT OFFICE.

CHARLES C. BARBOUR, OF GRAND RAPIDS, MICHIGAN.

DRYING AND HEATING APPLIANCE FOR LAUNDRIES, &c.

SPECIFICATION forming part of Letters Patent No. 631,061, dated August 15, 1899.

Application filed September 6, 1898. Serial No. 690,343. (No model.)

*To all whom it may concern:*

Be it known that I, CHARLES C. BARBOUR, a citizen of the United States, residing at Grand Rapids, in the county of Kent and State of Michigan, have invented certain new and useful Improvements in Drying and Heating Appliances for Laundries, Varnish-Rooms, &c., of which the following is a specification.

My invention relates to improvements in heating and drying appliances wherein the circulation of air is induced by a rotary fan and the circulating air is heated by passing between and around the pipes of a steam-coil; and its object is to extract as far as possible all foreign matter—as dust, &c.—from the air before it reaches the drying-room. I attain this object by the mechanism illustrated in the accompanying drawings, in which—

Figure 1 is a longitudinal section of the air-chamber and its several adjuncts on the line $x\ x$ of Fig. 2. Fig. 2 is a plan of the same on the line $y\ y$ of Fig. 1, and Fig. 3 is a sectional elevation of a modified form of air-chamber.

Similar letters refer to similar parts throughout the several views.

In the construction of my drier I make an air-chamber B, having placed in its open end a rotary fan A in position to force air swiftly into and through the air-chamber. At the back end of the air-chamber I form a return curved wall F and just back of the fan I form an upwardly-inclined slide or deflector E, that causes the inflowing air to glance upward, so that it will more readily follow the curve of the back wall of the air-chamber.

At the base of the curved back wall and between it and the deflector I place a pan G, designed to be filled with water, preferably flowing through, in position so that the current of air upon leaving the curved back will come directly in contact with the surface of the water, so that any dust that may be in the air is likely to be absorbed by the water, and thus prevented from passing into the drying-room D. Really but one "surface," so to speak, of the current of air comes in contact with the water, and to avert the danger of any dust escaping to the drying-room I place a second pan G', which is considerably longer than the first, immediately below the first, so that a thin passage-way H is formed between them for the current of air. This pan, like the first, is filled with water, so the current of air in passing around the upper pan and under the deflector must pass over and in contact with the surface of this pan of water, thus submitting the current of air to a second cleansing. The passage of the air over the upper pan causes a fine spray of water from its surface to flow over its edge into the lower pan, as indicated at $g$, (which, in fact, is the source of supply to the lower pan,) and thus forms a thin wall of dripping water, through which the current of air must pass, between the pans to pass through the passage-way H. After leaving the water the current of air passes through, between, and around the pipes of the steam-coil C, and thence into the drying-room D virtually clear from dust, a very necessary condition when drying varnishes or even when used for laundry drying.

In cases where the cleansing of the air is not so necessary a single pan of water may be used, either by dispensing with the lower pan in Fig. 1 or by the modified form shown in Fig. 3, where the current of air is direct, or virtually so.

The supply of water for the upper pan, where two pans are used, may be by a steady flow through water-pipes or by any other convenient means.

Having thus fully described my invention, what I claim as new, and desire to secure by Letters Patent of the United States, is—

In an appliance for purifying air for drying purposes, a rotary fan, an upwardly-inclined chute back of said fan, an air-chamber and a return-chute back of said incline, a shallow water-tank at the base of said return-chute and in the line of the air-current therefrom, a second water-tank below said shallow tank in position to receive the drippings from said tank and to form a thin air-chute between the tanks for the passage of air through the spray to the heating apparatus and to the drying-room, substantially as and for the purpose set forth.

Signed at Grand Rapids, Michigan, September 2, 1898.

CHARLES C. BARBOUR.

In presence of—
W. E. MOORE,
I. J. CILLEY.